United States Patent [19]

Bastioli et al.

[11] Patent Number: 4,886,847
[45] Date of Patent: Dec. 12, 1989

[54] FAST-CRYSTALLIZING POLYESTER COMPOSITIONS

[75] Inventors: Catia Bastioli; Vittorio Bellotti, both of Novara; Luciano Del Giudice, Milan, all of Italy

[73] Assignee: Montefibre S.p.A., Milan, Italy

[21] Appl. No.: 205,956

[22] Filed: Jun. 13, 1988

[30] Foreign Application Priority Data

Jun. 16, 1987 [IT] Italy ................ 20910 A/87

[51] Int. Cl.⁴ .......................... C08K 5/45; C08K 5/34; C08K 5/15; C08L 67/02
[52] U.S. Cl. ........................................ 524/84; 524/98; 524/111; 524/155; 524/167; 524/169; 524/170; 524/171; 524/24 D; 524/395; 524/396; 524/605
[58] Field of Search ............... 524/396, 605, 84, 111, 524/155, 170, 240, 395, 167, 169, 98, 171

[56] References Cited

U.S. PATENT DOCUMENTS 4,344,874 8/1982 Akagi et al. .................. 524/396
4,551,485 11/1985 Ragan et al. .................. 524/605

Primary Examiner—Lewis T. Jacobs
Attorney, Agent, or Firm—Stevens, Davis, Miller & Mosher

[57] ABSTRACT

Fast-crystallizing polyester compositions comprising a mixture consisting or consisting essentially of a polyester thermoplastic resin and of a nucleating agent selected from organic acid salts having the formula:

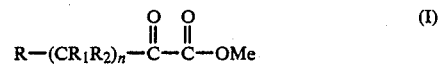

wherein:
R is an aromatic, cycloaliphatic or heterocyclic radical, optionally substituted in the ring;
$R_1$ and $R_2$ may be hydrogen or an alkyl radical containing from 1 to 4 C;
Me is an alkali or alkaline-earth metal, and
n is zero or an integer from 1 to 3.

13 Claims, No Drawings

FAST-CRYSTALLIZING POLYESTER COMPOSITIONS

DESCRIPTION OF THE INVENTION

The present invention relates to fast-crystallizing polyester compositions.

More particularly, the present invention relates to fast-crystallizing polyester compositions in which the polyester consists mainly of polyethyleneterephthalate (PET).

PET is used in large amounts, particularly in the fields of films and fibers, while its commercial development as a material for injection-molding has slackened off due to the long cycle times necessary to obtain dimensionally stable articles.

The PET compositions utilized for said injection-molding do not reach a high degree of crystallinity, the molding times being equal, in comparison with other plastic materials.

Therefore a premature drawing of a not-sufficiently crystallized shaped article may result in further crystallization in the course of time, with consequent change in the volume of the article itself.

However, it is known that the rate of crystallization of PET can be increased, which means that the crystallization temperature in the melt can be raised, by incorporating proper nucleating agents into the PET molding compositions.

Many nucleating agents for the PET crystallization are well known in the art.

For example, European Patent Application No. 31,201 describes the preparation of PET by reaction of terephthalic acid and ethylene glycol in the presence of sodium hydroxide, with "in situ" formation of the nucleating agent.

European Patent Application No. 21,648 describes the reaction of PET with a nucleating agent selected from ionizable metal salts of an organic compound having at least one acid proton. Examples of such salts are the sodium salts of substituted benzoic acids which contain at least one nitro, halogen, hydroxyl, phenyl, or oxyphenyl substituent.

European Patent Application No. 25,573 describes the nucleation of PET with a polyoxyalkylene containing at least one —COOMe group.

U.S. Pat. No. 3,761,450 describes lithium and/or sodium salts of aliphatic, cycloaliphatic, aromatic carboxylic acids, or heterocyclic polycarboxylic acids, containing up to 20 carbon atoms, as nucleating agents for PET.

British Pat. No. 2,015,014 describes sodium and potassium salts of selected organic polymers, containing pendent carboxylic groups, as agents capable of increasing the crystallization rate of PET in the composite materials.

U.S. Pat. No. 3,516,957 describes, as nucleating agents for PET, salts of alkali and alkaline-earth metals of organic acids having from 10 to 25 carbon atoms, such as for example sodium stearate.

Japanese Patent Publication No. 46/29977 describes sodium benzoate as a nucleating agent for PET.

U.S. Pat. No. 4,212,791 describes compositions comprising PET, an inert inorganic nucleating agent, an oligomer polyester crystallization promoter that does not contain carboxylates, and a copolyester-ether thermoplastic segmented elastomer.

European patent application No. 102,768 describes a method of nucleating PET by using a nucleating agent comprising an alkaline salt of a polyethylene terephthalate oligomer. The nucleating agent is first separately formed and then brought into contact with the PET to be nucleated.

Practically, however, nucleating agents which cause an appreciable increase in crystallization rates lead to undesirable molecular weight reduction; while the nucleating agents which do not lead to detrimental effects in this regard have little effect on the behavior of PET during crystallization.

U.S. Pat. No. 4,425,470 discloses attempts at nucleating PET without leading to drastic variations of the molecular weight; however, also in this case the results are not completely satisfactory.

In accordance with the present invention, it has now been discovered that the above drawbacks may be overcome by using, as nucleating agents, alkali or alkaline-earth salts of aryl- or cycloalkyl glyoxylic acids or derivatives thereof.

The subject matter of the present invention is, therefore, fast-crystallizing polyester compositions comprising a mixture consisting or consisting essentially of a thermoplastic polyester resin and a nucleating agent selected from among salts, or mixture of salts, of organic acids of the formula:

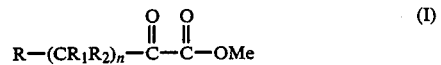

$$R-(CR_1R_2)_n-\overset{O}{\underset{\|}{C}}-\overset{O}{\underset{\|}{C}}-OMe \quad (I)$$

wherein:
R is an aromatic radical having from 6 to 18 carbon atoms, a cycloaliphatic radical having from 3 to 18 carbon atoms, a heterocyclic radical having from 4 to 18 carbon atoms and N, O or S as heteroatom, or an aromatic, cycloaliphatic or heterocyclic radical of the above type wherein one or more hydrogen atoms are substituted by a hydroxyl group, a halogen radical such as chlorine, bromine and fluorine, an alkyl radical or an alkyl-oxy radical having from 1 to 4 carbon atoms, a nitro radical, an aryl radical or aryl-oxy radical having from 6 to 18 carbon atoms, an alkylene-aryl radical having from 1 to 4 carbon atoms in the alkylene chain and from 6 to 18 carbon atoms in the aryl radical, an aryl-sulfone, aryl-sulfoxide, aryl-ketone, aryl-thio-ketone, an aryl-thio-phenoxy, or aryl-imine radical having from 6 to 18 carbon atoms in the aryl chain;

$R_1$ and $R_2$, which may be the same or different, may be hydrogen or an alkyl radical having from 1 to 4 carbon atoms;

Me is an alkali or alkaline-earth metal; and n is zero or an integer from 1 to 3.

Some examples of nucleating agents having the above formula (I) which may be advantageously used in the compositions of the present invention are those wherein R, $R_1$ and $R_2$ and Me have the following meanings:

| R | n | $R_1$ | $R_2$ | Me |
|---|---|---|---|---|
| (1) 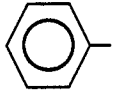 | 0 | — | — | Na |
| (2) 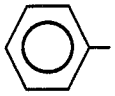 | 1 | H | H | Na |
| (3) 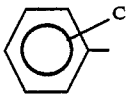 | 0 | — | — | Na |
| (4) 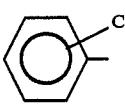 | 1 | H | H | Na |
| (5) 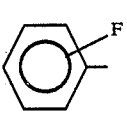 | 0 | — | — | Na |
| (6) 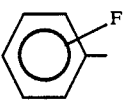 | 1 | H | H | Na |
| (7) 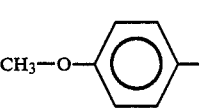 | 0 | — | — | Na |
| (8) 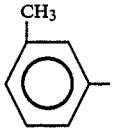 | 0 | — | — | Na |
| (9) 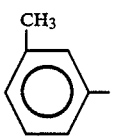 | 1 | H | H | Na |
| (10) 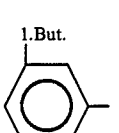 | 0 | — | — | Na |
| (11) 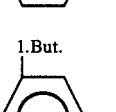 | 1 | H | H | Na |
| (12) 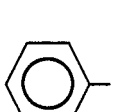 | 0 | — | — | Na |

-continued

| | R | n | R₁ | R₂ | Me |
|---|---|---|---|---|---|
| (13) | 3-nitrophenyl | 0 | — | — | Na |
| (14) | 4-methoxyphenyl | 1 | H | H | Na |
| (15) | phenyl | 1 | H | —CH₃ | Na |
| (16) | phenyl | 1 | —CH₃ | —CH₃ | Na |
| (17) | 4-methoxyphenyl | 1 | H | —CH₃ | Na |
| (18) | 1-chloronaphth-4-yl | 0 | — | — | Na |
| (19) | biphenyl-4-yl | 0 | — | — | Na |
| (20) | 1-methoxynaphth-4-yl | 0 | — | — | Na |
| (21) | 2-bromonaphth-1-yl | 0 | — | — | Na |
| (22) | 1-chloronaphth-4-yl | 0 | — | — | Na |
| (23) | 4-phenoxyphenyl | 0 | — | — | Na |
| (24) | 4-benzylphenyl | 0 | — | — | Na |

-continued

| R | n | $R_1$ | $R_2$ | Me |
|---|---|---|---|---|
| (25) 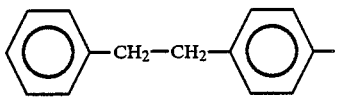 | 0 | — | — | Na |
| (26) 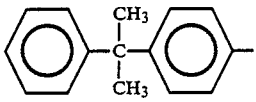 | 0 | — | — | Na |
| (27) 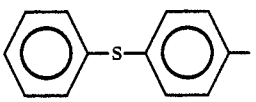 | 0 | — | — | Na |
| (28) 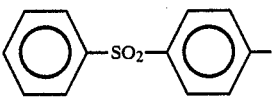 | 0 | — | — | Na |
| (29) 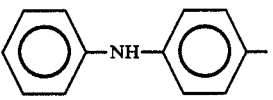 | 0 | — | — | Na |
| (30) 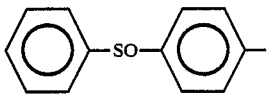 | 0 | — | — | Na |
| (31) 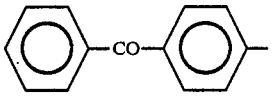 | 0 | — | — | Na |
| (32) 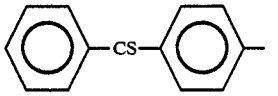 | 0 | — | — | Na |
| (33) 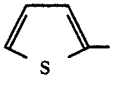 | 0 | — | — | Na |
| (34) 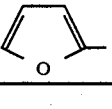 | 0 | — | — | Na |

The corresponding salts wherein Me is potassium, calcium, magnesium or strontium may also be used.

The sodium salts of aroyl-formic acids are particularly effective.

In the nucleating agents of the above formula (I), particularly when n=1, it is to be understood that these include alkali and/or alkaline-earth salts of the phenyl pyruvic acids described in U.S. Pat. No. 4,351,952 the contents of which are herein incorporated by reference.

The nucleating agents having the above formula (I) are per se well known compounds, or they may be prepared according to conventional methods. For example, the benzoxyl formic acid or phenyl glyoxylic acid may be prepared by oxidation of mandelic acid. More conveniently, the aroyl-formic acids may be prepared as described by F. Francalanci et al in *J. Organometallic Chem.*, 301 (1986), C27-C30.

It is to be understood that in the polyester compositions of the present invention, mixtures of salts having the above formula (I) may also be used.

Any thermoplastic polyester resin may be used for preparing the compositions of the present invention. Polyethyleneterephthalate and the copolymers thereof containing small amounts or different co-monomeric units are preferred.

The nucleating agent of the above formula (I) may be added to the polyester resin:

1. directly, in amounts generally lower than 2% by weight, with respect to the PET, or
2. after having previously reacted it, in large amounts, with a polyester resin such as polyethyleneterephthalate, polybuteleneterephthalate and copolymers thereof, PET modified by the introduction of polyoxyethylenic, polyarylate, polycarbonate segments, thereby obtaining a master-batch or mother-blend capable of nucleating the PET without leading to molecular weight reduction.

The master-batch may be obtained by conventional compounding techniques by adding the nucleating agent of the above formula (I), in concentrations between about 0.5 and about 20% by weight, and preferably between 1 and 10% by weight, to the above polyester resins.

The molecular weight and the chemicophysical properties, such as the viscosity of the master-batch or basic-blend containing the nucleating agent utilized in the preparation of the compositions of the present invention, are controlled by the amount of the alkali metal or of the alkaline-earth metal which one wishes to introduce and vary in inverse ratio to its concentration.

Generally, however, the basic blend containing the nucleating agent of the above formula (I) has an inherent viscosity measured in phenol/tetrachloroethane (60/40) at a concentration of 0.25 g/dl and at 30° C., higher than 0.1 dl/g and an average number molecular weight Mn higher than 1,000.

The alkali metal content in the final polyester composition may be varied as a function of the crystallization temperature to be reached.

When the nucleating agent of the above formula (I) is directly added (the above mentioned case 1), it is admixed with the thermoplastic polyester resin in the molten state in amounts ranging from 0.05 to 2% by weight, preferably from about 0.1 to 0.5% by weight, with respect to the resin.

When the nucleating action is obtained by master-batch (the abovementioned case 2), amounts of master-batch are added to the thermoplastic polyester resin, preferably PET, in percentages between 1 and 15%, and preferably between about 2 and 10%, by weight.

The fast-crystallizing polyester compositions of the present invention are characterized by high crystallization temperatures, high crystallization rates, a homogeneous distribution, and a low concentration of the nucleating agent.

Particularly, highest crystallization kinetics may be obtained by directly adding the nucleating agent of the above formula (I) (the above mentioned case 1) in very low percentages; it is moreover, possible to realize good nucleating rates, without varying the viscosity of the polyester composition, by adding the nucleating agent via master-batch, as in the above case 2.

The nucleating agents of the present invention having the above formula (I) may be introduced in the polyester for obtaining the relevant compositions by any conventional method suitable for incorporating additives in the polyester in the molten state, such as for example by compounding techniques in blenders, extruders, etc.

The compositions may be additioned with inert fillers, such as fibers of glass, carbon, boron, etc., and/or with inorganic particles of glass, mica, zeolites, graphite, talc, etc.

Moreover, the usual additives and or auxiliary substances may be added to the compositions to improve the characteristics of heat stability, oxidative stability, and light stability, and other additives such as pigments, dyestuffs, flame-retardant agents, release agents, various inert fillers, as well as small amounts of other types of thermoplastic resins or small amounts of rubbery compositions to confer good impact properties.

The polyester resin for preparing the compositions containing the nucleating agent of the above formula (I) is obtained according to well-known polycondensation processes by reaction of an aromatic diacid, such as terephthalic acid or a cycloaliphatic acid such as cyclohexanedicarboxylic acid, and methyl esters thereof with aliphatic, aromatic or cycloaliphatic glycols such as ethylene glycol, butylene glycol, etc.

The polyester reins have a molecular weight higher than 5,000.

The compositions of the present invention may be used for producing large numbers of articles by injection- or extrusion-molding techniques, and particularly auto car components, electric components, etc. They may also be used in the form of fibers, films, sheets, etc.

For a still better understanding of the present invention and for putting it into practice, a few illustrative examples are given hereunder, which are not to be construed, however, as a limitation on the scope of the invention.

The effectiveness of the nucleating agent was evaluated on the basis of the temperature of the crystallization peak, of polyester resin/nucleating agent mixtures during the cooling of the melt, by means of differential thermal analysis.

The inherent viscosity ($\eta$) is measured at 0.25 dl/g in 60:40 phenol:tetrachloroethane, at 30° C.

The average number molecular weight Mn, and the average weight molecular weight $M_w$, were calculated from GPC (gel permeation chromatography), using m-cresol as a solvent, at 100° C.

The sodium content was determined by atomic absorption. The crystallization temperatures from the melt were measured by the PERKIN ELMER DSC 7 differential colorimeter by reading the temperature corresponding to the maximum of the crystallization exotherm.

In the following examples, PET having a crystallization temperature of 190° C. was used.

EXAMPLE 1

250 g of PET, having an inherent viscosity of 0.78 dl/g, and previously dried for 12 hours at 120° C. under vacuum, were blended in a blender with 0.75 g of sodium phenylglyoxylate, and the thus-obtained blend was extruded at 280° C.

The chemicophysical properties of the thus-obtained composition were:
Inherent viscosity=0.51 dl/g
Crystallization temperature from the melt: 219° C.

For comparison, the above example was repeated by operating in the same way, and by substituting the sodium phenylglyoxylate with sodium benzoate.

The following values for the composition were obtained:
Inherent viscosity=0.65 dl/g (phenol:TCE 60:40 at 30° C.).
Crystallization Temperature from the melt: 203° C.

EXAMPLE 2

(a) Master-batch preparation
475 g of PET granules, having an inherent viscosity of 0.78 dl/g, and 25 grams of sodium salt of phenylglyoxylic acid were blended in a blender.
The mixture was then extruded at 280° C.

The thus-obtained sample showed an inherent viscosity of 0.24 dl/g.

(b) Use of the master-batch 250 g of PET having an intrinsic viscosity of 0.78 dl/g, dried as described above in Example 1, were mixed with 10 g of the master-batch obtained as in (a) above, and the mixture was extruded at 280° C.

The chemicophysical properties of the thus-obtained composition were:

Inherent viscosity=0.76
Crystallization temperature from the melt=210° C.

EXAMPLE 3

(a) Master-batch preparation 475 g of PET granules having an inherent viscosity of 0.78 dl/g and 25 g of the sodium salt of phenylpyruvic acid were mixed in a blender.

The mixture was then extruded at 280° C.

The thus-obtained sample had an intrinsic viscosity of 0.27 dl/g.

(b) Use of the master-batch 250 g of PET having an inherent viscosity of 0.78 dl/g, dried as described in Example 1, were additioned with 10 g of the master-batch obtained as above in (a), and the mixture was extruded at 280° C.

The chemicophysical properties of the thus-obtained composition were:

Inherent viscosity : 0.73 dl/g
Crystallization temperatures from the melt : 211° C.

What is claimed is:

1. Fast-crystallizing polyester compositions comprising a mixture consisting essentially of a thermoplastic polyester resin and a nucleating agent, characterized in that the nucleating agent is selected from the group consisting of salts, or mixtures of salts, of organic acids of the formula:

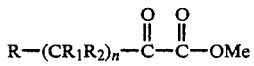

(I)

wherein:

R is an aromatic radical having from 6 to 18 carbon atoms, a cycloaliphatic radical having from 3 to 18 carbon atoms, a heterocyclic radical having from 4 to 18 carbon atoms and N, O or S as heteroatom, or an aromatic, cycloaliphatic or heterocyclic radical as defined above wherein one or more hydrogen atoms are substituted by a hydroxyl group, a halogen radical, an alkyl radical or an alkyl-oxy radical having from 1 to 4 carbon atoms, a nitro radical, an aryl radical or an aryl-oxy radical having from 6 to 18 carbon atoms, an alkylene-aryl radical having from 1 to 4 carbon atoms in the alkylene chain and from 6 to 18 carbon atoms in the aryl radical, an aryl-sulfone, aryl-sulfoxide, aryl-ketone, aryl-thioketone, aryl-thio-phenoxy, or aryl-imine radical having from 6 to 18 carbon atoms in the aryl chain;

$R_1$ and $R_2$, which may be the same or different, may be hydrogen or an alkyl radical having from 1 to 4 carbon atoms;

Me is an alkali or alkaline-earth metal; and n is zero or an integer from 1 to 3.

2. Compositions according to claim 1, wherein Me in the formula (I) is sodium.

3. Compositions according to claim 1 or 2, wherein the polyester themoplastic resin is polyethyleneterephthalate.

4. Compositions according to claim 1 or 2, wherein the nucleating agent is directly added to the polyester thermoplastic resin in amounts between 0.05% and 2% by weight with respect to the resin.

5. Compositions according to claim 4, wherein the nucleating agent is added in amounts between about 0.1% and 0.5% by weight.

6. Compositions according to claim 1 or 2, wherein the nucleating agent is added in the form of a master-blend separately prepared.

7. Compositions according to claim 6, wherein the master-blend is added in an amount between 1 and 15% by weight with respect to the starting resin.

8. Compositions according to claim 6, wherein the master-blend is added in an amount between 2 and 10% by weight with respect to the starting resin.

9. Compositions according to claim 7, wherein the master-blend is obtained by blending the nucleating agent having the formula (I) with a polyester resin in concentrations between 0.5% and 20%, with respect to the resin.

10. Compositions according to claim 7, wherein the master-blend is obtained by blending the nucleating agent having the formula (I) with a polyester resin in concentrations between 1 and 10%, with respect to the resin.

11. Compositions according to claim 8, wherein the polyester resin of the master-blend is selected from the group consisting of polyethylene terephthalate, polybutylene terephthalate, copolymers thereof, and polyethyleneterephthalate modified by the introduction of polyoxyethylenic, polyarylate or polycarbonate segments.

12. Compositions according to claim 6, wherein the master-blend has an inherent viscosity higher than 0.1 dl/g and a number-average molecular weight higher than 1,000.

13. Fast-crystallizing polyester compositions according to claim 1 or 2 having in addition inert fillers selected from the group consisting of glass fibers, carbon fibers or boron fibers, particulate glass, mica, zeolites, graphite, and talc or an additive selected from the group consisting of pigments, dyestuffs, flame-retardant agents, release agents, thermoplastic resins and rubbery materials.

* * * * *